United States Patent
Avina et al.

(10) Patent No.: US 12,437,067 B1
(45) Date of Patent: Oct. 7, 2025

(54) SUSPICIOUS FILENAME DETECTION USING A DEEP LEARNING NEURAL NETWORK

(71) Applicant: Splunk Inc., San Francisco, CA (US)

(72) Inventors: Glory Emmanuel Avina, Brentwood, CA (US); Abhinav Mishra, San Francisco, CA (US); Kumar Sharad, Dresden (DE); Namratha Sreekanta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 18/418,064

(22) Filed: Jan. 19, 2024

Related U.S. Application Data

(60) Provisional application No. 63/440,088, filed on Jan. 19, 2023.

(51) Int. Cl.
  *G06F 21/55* (2013.01)
  *G06N 3/084* (2023.01)

(52) U.S. Cl.
  CPC ........... *G06F 21/554* (2013.01); *G06N 3/084* (2013.01); *G06F 2221/033* (2013.01)

(58) Field of Classification Search
  CPC .................... G06F 21/554; G06F 2221/033
  See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Hee Soo Kim
(74) *Attorney, Agent, or Firm* — Rutan & Tucker, LLP; Kyle M. St. James

(57) ABSTRACT

Disclosed herein is a machine learning-based approach to detect suspiciously named processes. When malware executes on a networking device, such as a laptop or desktop computer, the malware may create a copy of itself, assign the copy a process name consisting of random characters, and store the copy in a directory of the networking device. As characters of words in a given language follow patterns and rules, the presence of each character is not equally likely. In contrast, characters in random sequences have an equal likelihood of being present. In some implementations disclosed herein, a character-level recurrent neural network (RNN) is trained to distinguish between randomly generated filenames from those created by an user and thus, identify malware attacks. In some implementations, a character-level RNN is configured to classify filenames as malicious or benign.

20 Claims, 13 Drawing Sheets

(56) References Cited

U.S. PATENT DOCUMENTS

| | | | |
|---|---|---|---|
| 10,521,587 B1* | 12/2019 | Agranonik | G06F 21/563 |
| 10,956,477 B1* | 3/2021 | Fang | G06F 40/30 |
| 2019/0098106 A1 | 3/2019 | Mungel et al. | |
| 2021/0141897 A1* | 5/2021 | Seifert | G06F 21/565 |
| 2021/0157914 A1* | 5/2021 | Gauthier | G06N 20/20 |
| 2024/0330446 A1* | 10/2024 | Bulut | G06N 3/0895 |

OTHER PUBLICATIONS

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

FIG. 4

App: Deep Learning Toolkit for App ▾

Content  Overview▾ Configuration▾ Examples▾ Containers  Models  Other▾  Search

ⓘ Administrator▾ Messages▾ Setting▾ Activity▾ Help▾ |Find|  🔍

☐ Deep Learning Toolkit for App

[Edit] [Export▾] [...]

33,253 — Filenames Analyzed — 502

24,011 — Suspicious Filenames — 504

9,242 — Benign Filenames — 506

Top Five File Sources

| Source | Suspicious Filenames ⬥ |
|---|---|
| 87.194.216.51 | 948 |
| 211.166.11.101 | 742 |
| 128.241.220.82 | 621 |
| 109.169.32.135 | 514 |
| 194.215.205.19 | 512 |

508

109.169.32.135 targeted accounts

| Username ⬥ | count ⬥ |
|---|---|
| admin | 22 |
| administrator | 19 |
| root | 15 |
| operator | 14 |
| system | 13 |

< prev [1] 2 3 4 5 6 7 8 9 10 next >

SUSPICIOUS FILENAME DETECTION USING A DEEP LEARNING NEURAL NETWORK

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Malwares and malicious programs such as ransomware often use tactics, techniques, and procedures such as copying malicious files to a local machine in order to propagate themselves across the network. There are various known malware tactics, techniques, and procedures that include, for example, network device users unknowingly downloading malware through malicious links or attachments through phishing emails, phishing websites, or otherwise infected or malicious websites. Other tactics and techniques include the distribution of malicious files through file-sharing networks or directed cyberattacks carried out through the exploitation of soft or network vulnerabilities.

BRIEF DESCRIPTION OF THE DRAWINGS

Illustrative examples are described in detail below with reference to the following figures:

FIG. 4 is a first sample graphical user interface illustrating a listing of deployed or deployable stored models including a character-level recurrent neural network according to an implementation of the disclosure;

FIG. 5 is a second sample graphical user interface depicting illustrative results of the deployment of a character-level recurrent neural network according to an implementation of the disclosure;

DETAILED DESCRIPTION

Figure 1:
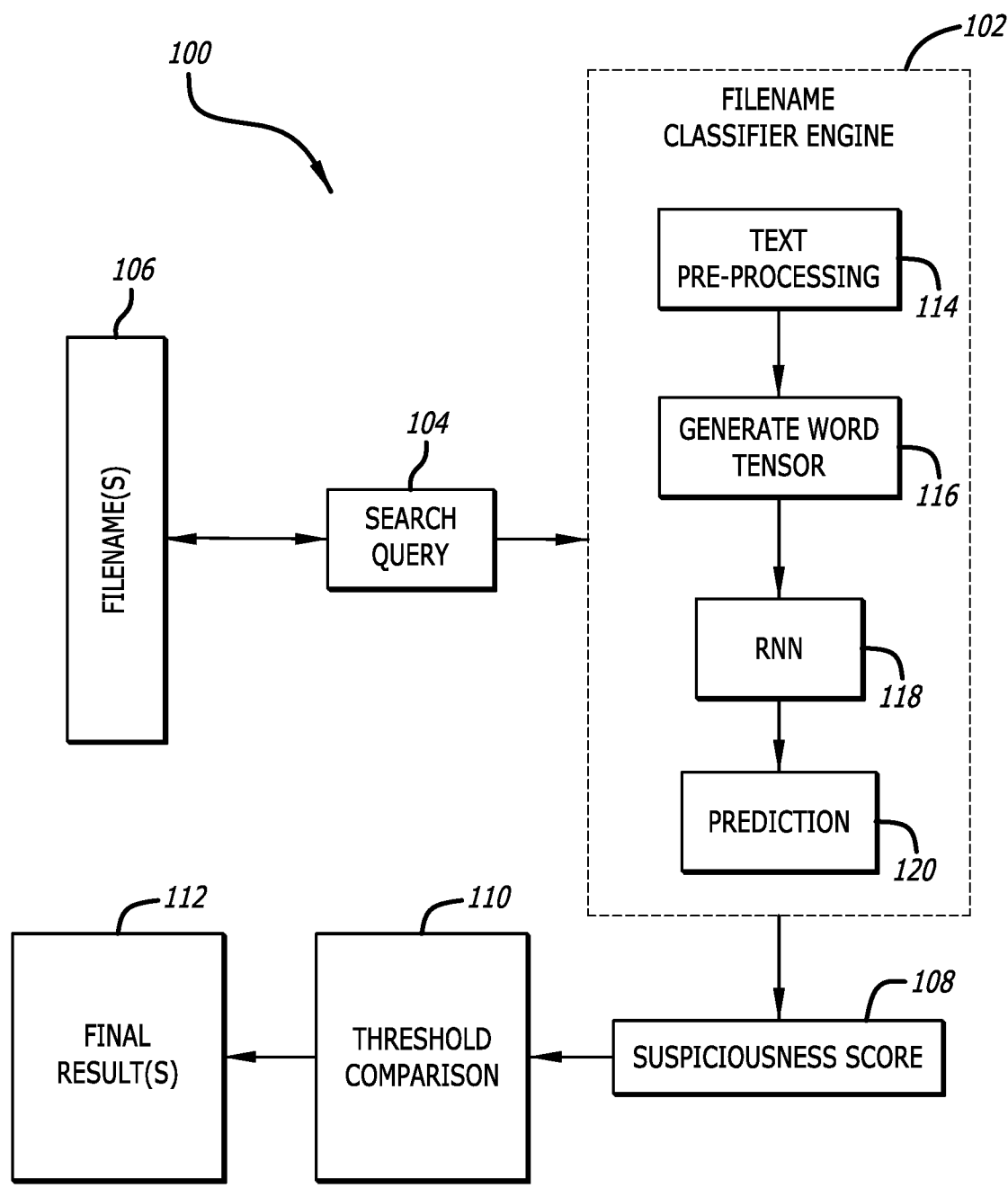
FIG. 1 is a diagrammatic flow illustrating a first implementation of a character-level recurrent neural network to determine whether a filename is suspicious according to an implementation of the disclosure.

As noted above, malwares and malicious programs such as ransomware often use tactics, techniques, and procedures such as copying malicious files to a local machine in order to propagate themselves across the network. This often leads to ransomware attacks, data theft, and the disruption of services. Further, cyberattacks continue to increase in their sophistication. For example, cybercriminals often disseminate malicious software via sophisticated phishing campaigns where provided malware is crafted to perform activities such as credential harvesting, mail exfiltration, cryptomining, point-of-sale data exfiltration, and ransomware deployment among other actions.

In many instances, cybercriminals disseminate malware loaders as part of their malicious cyber campaigns, where a loader is configured to deliver and execute additional malware on a target network device. A malware loader may start an infection chain by distributing a payload through any of the many known tactics, techniques, and procedures. For example, a malware loader may be deployed to a network device through a communication session that was established with a command and control server and installed on the network device. After successful installation, the loader malware executes a payload, which performs activities such as credential harvesting, mail exfiltration, cryptomining, point-of-sale data exfiltration, and the deployment of ransomware.

One key indicator of compromise is that after successful execution of the malware payload, the malware payload copies itself as an executable file with a randomly generated file name, which is then stored in one of the directories of the network device. Typically, the randomly generated file name is a 12-character name such as, e.g., "hwbpoidtowerp.exe." Hence, it becomes important to distinguish filenames that have been organically created by a user from those automatically generated in a random fashion by a malware payload.

Herein, a machine learning-based approach to detect suspiciously named processes is disclosed. The approach is based on the key observation that the character distribution of suspicious process names is different from benign names. Specifically, characters of words in the English language follow patterns and rules; thus, the presence of each character is not equally likely. In contrast, characters in random sequences have an equal likelihood of being present. Thus, the machine learning-based approach utilizes such observation by analyzing the sequence of characters of a filename and modeling the probability that a filename is suspicious. The disclosure details how this probability distribution is used to construct a decision boundary configured to classify a filename as suspicious or benign.

As generating filenames is a critical operation in the propagation of malwares, the disclosure details deployment scenarios and training of a recurrent neural network (RNN) that is configured to distinguish between randomly generated filenames from those created by an user and thus, identify malware attacks. In some implementations, a character-level RNN is configured to classify filenames as malicious or benign. A RNN is a class of neural networks that enables operation over a sequence of vectors.

In one particular example, a character-level RNN is trained to predict the class of a given filename based on a history of the characters of the filename previously analyzed. Based on the observation that the character distribution of random sequences is different from that of sequences found in words of one or more predetermined languages (e.g., the English language) and filenames generated by human users (i.e., not randomly generated) often included one or more known words.

Referring now to FIG. 1, a diagrammatic flow illustrating a first implementation of a character-level recurrent neural network to determine whether a filename is suspicious is shown according to an implementation of the disclosure. The flow 100 illustrates one implementation of a filename analysis carried out by a filename classifier engine 102. In such an implementation, a search query 104, such as a pipelined search query, is executed that results in retrieval of one or more filenames 106. The filename classifier engine 102 performs a classification analysis on the one or more filenames 106 resulting in a suspiciousness score 108. A threshold comparison 110 may then be performed to compare to the suspiciousness score 108 to predetermined a threshold, which yields a final result 112 for each of the one or more filenames 106, where the final result 112 indicates a predicted classification for each of the one or more filenames 106.

The filename classifier engine 102 may comprise a pipeline of operations including text pre-processing 114, generation of a word tensor 116, and deployment of a character-level recurrent neural network 118, which provides a prediction 120. In some instances, generating the word tensor 116 includes encoding the one or more pre-processed filenames 106 into a feature vector. Example encodings include character-level embedding (e.g., via a convolutional neural network (CNN)), positional encoding, one-hot vector encoding, etc. The pre-processing 114 is discussed in further detail below with respect to FIGS. 2A-2B. As a brief summary, pre-processing 114 may include operations of removing a file extension from the filename and isolating a process name, converting the characters of the process name to a lower case, removing special characters and number text characters from the process, and removing character accents from the process name. As discussed below, in some instances, the word tensor 116 has a size of <pre-processed filename length, batch size, number of possible characters>.

Figure 2A:
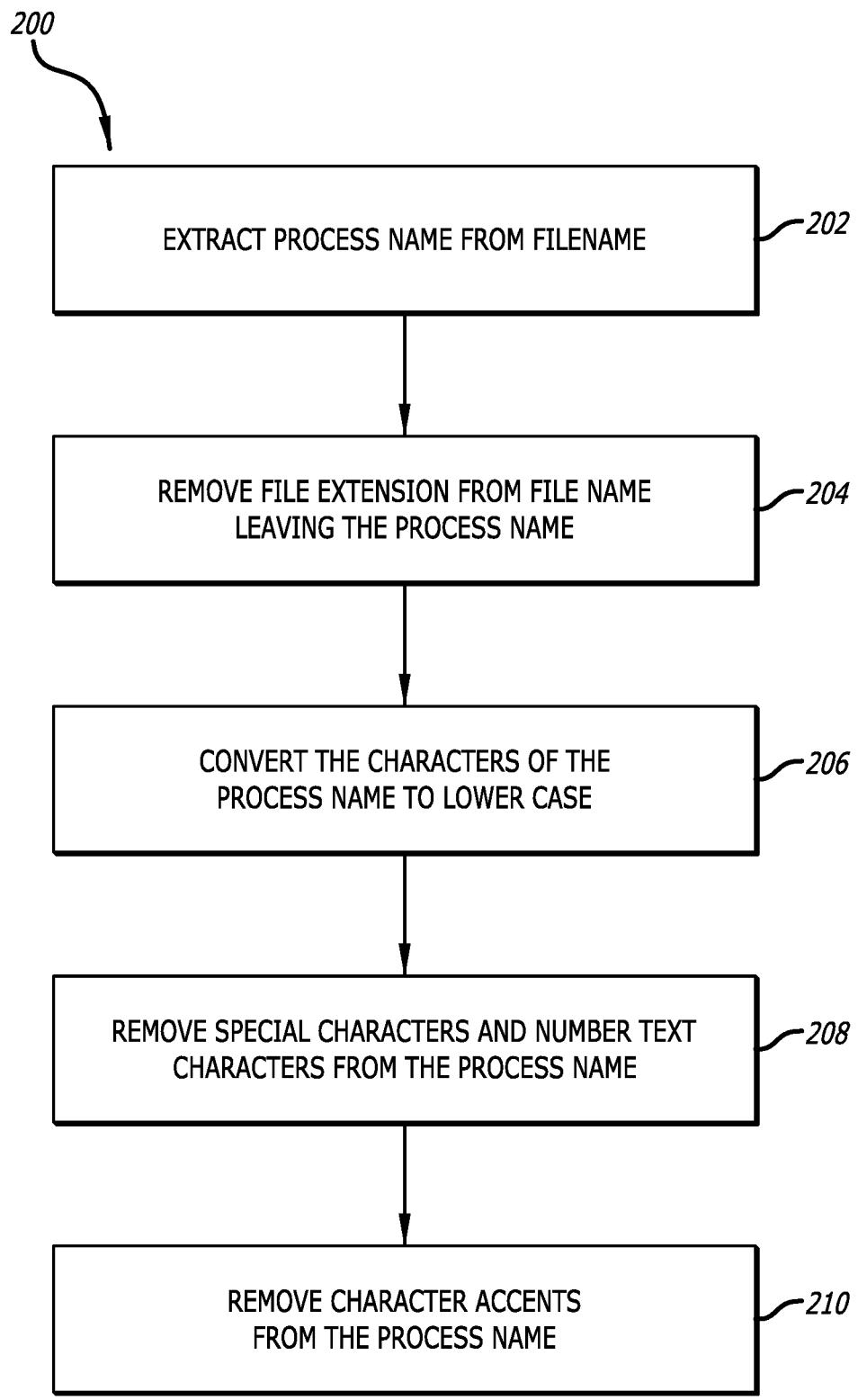
FIG. 2A is a flowchart illustrating example operations for performing pre-processing of a filename according to an implementation of the disclosure.

Referring to FIG. 2A, a flowchart illustrating example operations for performing pre-processing of a filename is shown according to an implementation of the disclosure. Each block illustrated in FIG. 2A represents an operation in the process 200 performed by, for example, the filename classifier engine 102 of FIG. 1. It should be understood that not every operation illustrated in FIG. 2A is required. In fact, certain operations may be optional to complete aspects of the process 200. The discussion of the operations of process 200 includes reference to FIGS. 1 and 2B. The process 200 for performing pre-processing of a filename assumes that a filename has been received by the filename classifier engine 102 of FIG. 1 that is to be analyzed and classified, e.g., as suspicious or benign. However, other classifications may be utilized based on the training and configuration of the RNN discussed above.

Figure 2B:
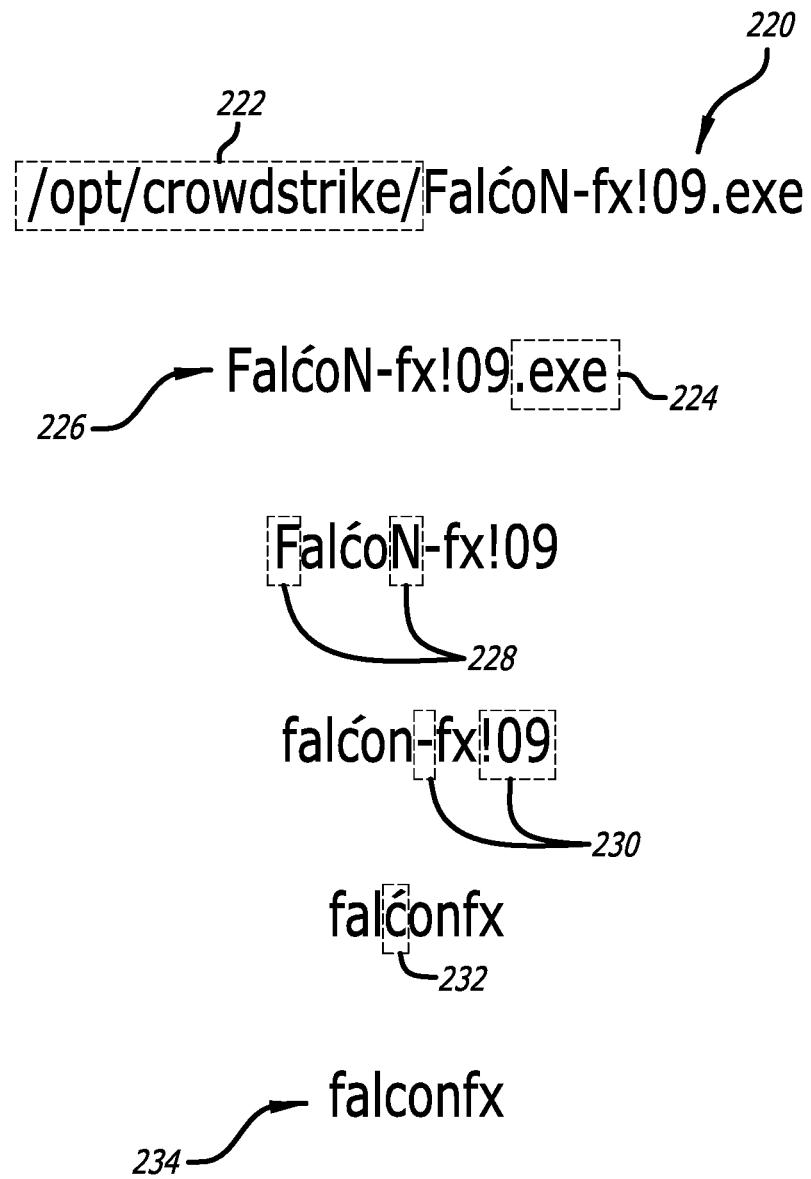
FIG. 2B is an illustrative example of the operations performed in FIG. 2B according to an implementation of the disclosure.

The process 200 begins with an operation of extracting a process name from the filename (block 202). As illustrated in FIG. 2B, an illustrative filename 220 is shown within a full file path such that a first step in extracting the process name is to identify a path 222 of the filename 220. In some instances, the path 222 may include a volume or drive letter and/or a directory name, where the directory name may include subdirectories indicating a nested directory hierarchy. The process 200 of performing pre-processing subsequently includes identifying and removing a file extension from the filename, thus isolating the process name (block 204). Referring again to FIG. 2B, the file extension 224 is identified and the process name 226 is isolated.

In some implementations, the characters of the process name are converted to lower case (block 206). As shown in FIG. 2B, the uppercase characters 228 are identified and converted to lower case. Further, special characters and/or number text characters may be removed from the process name (block 208). Referring again to FIG. 2B, special characters and number text characters (collectively, 230) are identified and removed. However, in some embodiments, alphanumeric or other characters may be processed by the filename classifier engine and numbers, or other characters, may be left in the extracted filename. Finally, character accents are removed from the process name (block 210). FIG. 2B illustrates the operation of removing character accents on the character 232, resulting in the pre-processed filename 234.

Figure 3:
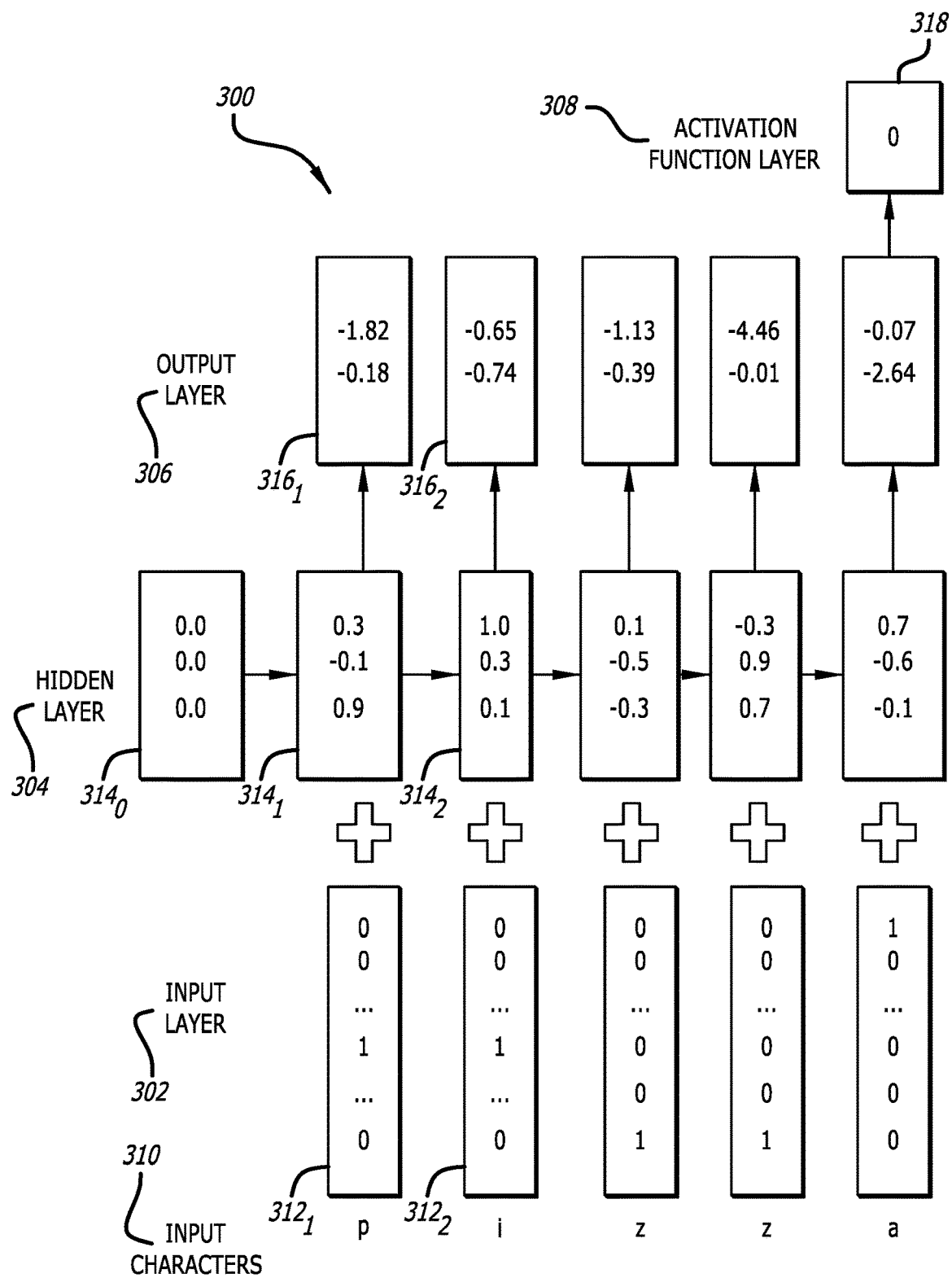
FIG. 3 is a diagram of an illustrative example of processing of a sample filename with a character-level recurrent neural network according to an implementation of the disclosure.

Referring to FIG. 3, a diagram of an illustrative example of processing of a sample filename with a character-level recurrent neural network is shown according to an implementation of the disclosure. The recurrent neural network (RNN) 300 shown in FIG. 3 is comprised of an input layer 302, a hidden layer 304, an output layer 306, and an activation function layer 308. The RNN 300 is configured to receive a word tensor representing a pre-processed filename (e.g., a process name as discussed above with respect to FIGS. 2A-2B). The word tensor may be comprised of a set of one-hot vectors representing the process name (input characters 310). The input layer 302 processes each encoded character of the process name individually and sequentially. As is understood about a RNN, the RNN 300 includes recurrent connections with the hidden layer 304 such that information about previously processed characters of a process name is utilized in processing subsequent characters of the process name, which enables the RNN 300 to capture dependencies and patterns within the process name.

Now referring to the particular example illustrated in FIG. 3, the original filename for the example is "Pizza11.exe" and will be pre-processed resulting in a process name of "pizza," wherein the pre-processing may follow the process of FIG. 2A. The first step in processing the process name "pizza" by the RNN 300 is to feed the first character ("p") to the input layer 302, which processes the character to generate a one-hot character vector 312$_1$ and combines the one-hot vector with an internal state of the RNN 300 from processing the previous character by the hidden layer 304. For the first character of a process name, the internal state of the RNN 300 may be represented with a default vector, e.g., all zeros. The hidden layer 304 generates a result which is passed to the output layer 306, which utilizes a negative log likelihood loss function and a log softmax function, resulting in the output vector 316$_1$, which is an indication of the classification to which the process name belongs based on processing of the letter ("p"). The negative log likelihood loss function and log softmax functions ensure the output vectors provide a probability distribution over the possible classes. In the example of FIG. 3, the predictions generated following the processing of each letter are represented by a numerical vector with the upper number representing a benign classification and the lower number representing a suspicious classification, where the larger the number, the more confident the prediction of the corresponding classification.

Following processing of the first letter ("p"), the second letter ("i") is provided as input to the input layer 302. An encoding 3122 is generated and combined with the internal state 3141 based on the processing of the letter ("p"), where the combination is processed by the hidden layer 304. The processing of the letter ("i") results in an adjusted internal state 3142 and results provided to the output layer 306, which utilizes the negative log likelihood loss function and log softmax, resulting in the output vector 3162. The process is repeated for each layer in the process name ("pizza"). The prediction following the processing of the final letter of the process name ("a") is processed by an activation function layer 308 (e.g., exponent is taken of the values of the output vector resulting from processing the letter "a"), which provides a prediction score 318, such as a value of either 1 and 0, where 0 represents a prediction of benign and 1 represents a prediction of suspicious. Of course, the values may be reversed or other values may be the result of the activation function of the activation function layer 308.

Figure 4:
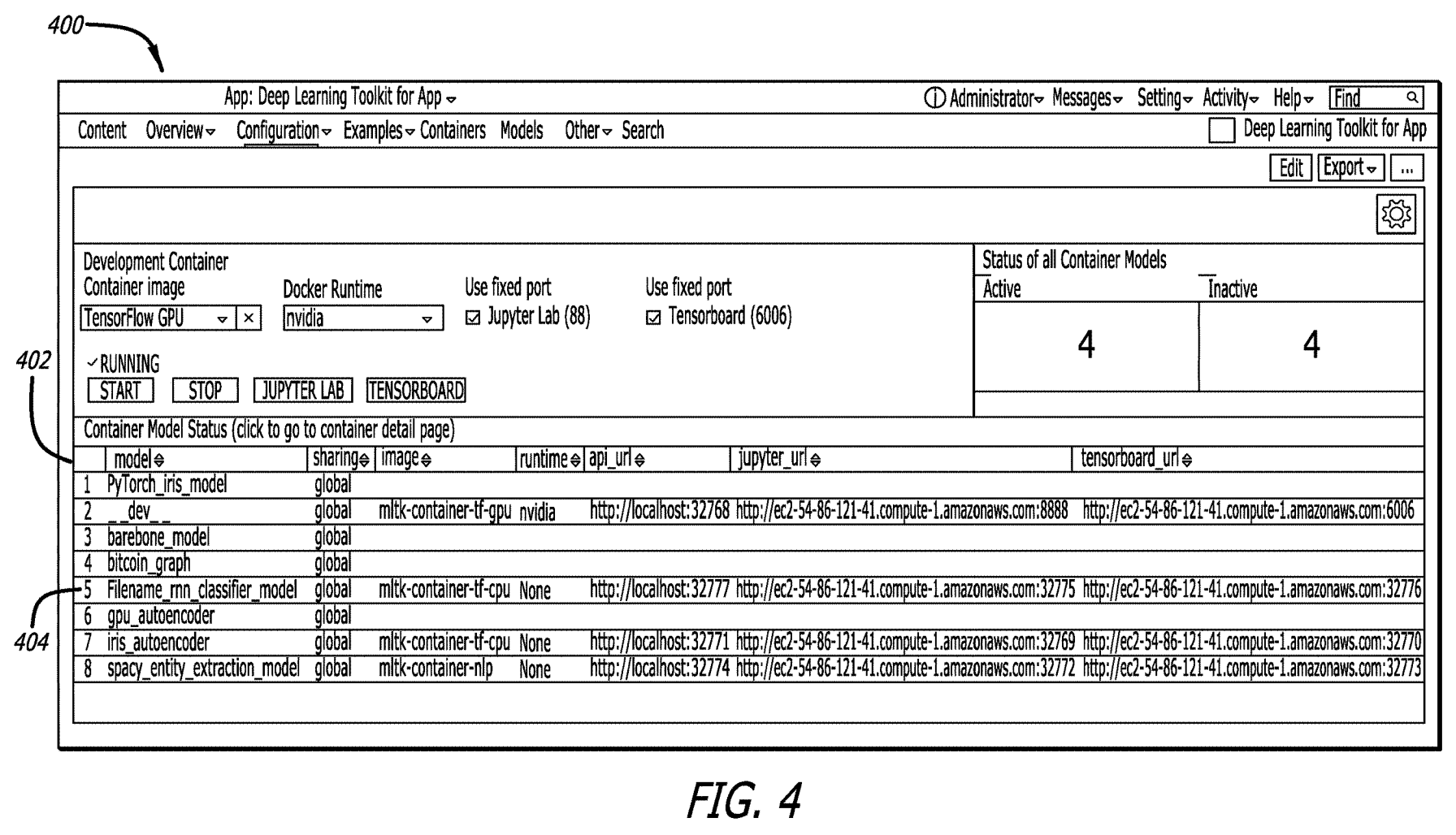

Referring to FIG. 4, a first sample graphical user interface illustrating a listing of deployed or deployable stored models including a character-level recurrent neural network is shown according to an implementation of the disclosure. The graphical user interface (GUI) 400 of FIG. 4 is illustrated as being displayed within an internet browser, which indicates that the GUI 400 is configured for access by a network device over a network, such as the internet or a local, enterprise network. The GUI 400 provides an illustrative dashboard configured to provide a user, e.g., a network administrator or security operations center (SOC) analyst), a listing of stored machine learning models that are under deployment (e.g., currently processing or scheduled for processing) or may be deployed ("listing 402"). In many instances, the listing 402 provides a table where each row pertains to an individual model and the columns pertain to various fields of information or metadata of an individual model. For example, some columns may provide information such as model names, sharing permissions, a link to an image of the model, and/or links to an API, JUPYTER® notebook, and/or Tensor associated with the individual model.

One example of a model within the listing 402 is the model 404 named, "Filename_rnn_classifier_model", which may refer to a character-level RNN as discussed herein. Thus, FIG. 4 illustrates that, following training and storage of a character-level RNN in a container of a deep learning platform (see FIG. 7), the character-level RNN appears in the dashboard of the GUI 400 and is deployable by a user therefrom. Thus, the user may access the model from the GUI 400 and deploy or schedule deployment thereof.

Referring to FIG. 5, a second sample graphical user interface depicting illustrative results of the deployment of a character-level recurrent neural network is shown according to an implementation of the disclosure. Similar to the GUI 400 of FIG. 4, the GUI 500 of FIG. 5 is illustrated as being displayed within an internet browser, which indicates that the GUI 500 is configured for access by a network device over a network, such as the internet or a local, enterprise network. The GUI 500 provides an illustrative dashboard configured to provide a user results of the deployment of a character-level RNN configured to classify filenames as either benign or suspicious. The GUI 500 merely provides one example of such a dashboard.

The GUI 500 includes various display sections including display sections 502-510. Each of the display sections 502-506 provide a number representative of a number of filenames analyzed (display section 502), a number of filenames classified as suspicious (display section 504), and a number of filenames classified as benign (display section 506). In some embodiments, the visual representation of one or more of the numbers provided in the display sections 502-506 may vary, e.g., by size, color, or pattern, which may indicate a feature of the number. For example, when the number of suspicious filenames exceeds a threshold (e.g., for a predetermined time threshold), the number of suspicious filenames may be displayed in a particular color (e.g., red). Similarly, when the percentage of filenames classified as suspicious exceeds a threshold (e.g., for a predetermined time threshold), the number of suspicious filenames may be displayed in a particular color (e.g., red).

Additionally, the display section 508 may provide a listing of sources that provided files classified as having suspicious filenames. For instance, a SOC analyst of an enterprise may be interested in quickly assessing the sources (e.g., IP addresses) from which the largest number of files having filenames classified as suspicious were received. Such a feature may enable the SOC analyst to detect a network attack. In some implementations, when a source (such as an IP address, email address, etc.) provides a number of files that have filenames classified as suspicious, the source may be automatically blocked from transmitting further network data into an enterprise network. In some implementations, the life of a file may monitored and recorded. Thus, when a file is classified as having a suspicious filename, a determination may be made as to a direct source of the file (e.g., IP address from which the file was received) or a determination may be made as to a parent file that generated the file having a suspicious filename such that the direct source of the parent file made me determined.

The display section 510 may provide a listing of target accounts (e.g., based on permission level, department within an enterprise, job title within an enterprise, etc.), e.g., a number of admin, administrator, root, operator, and/or system accounts. The display section 510 may also provide a count of the number of each type of account within which a filename classified as suspicious was analyzed.

Figure 6:
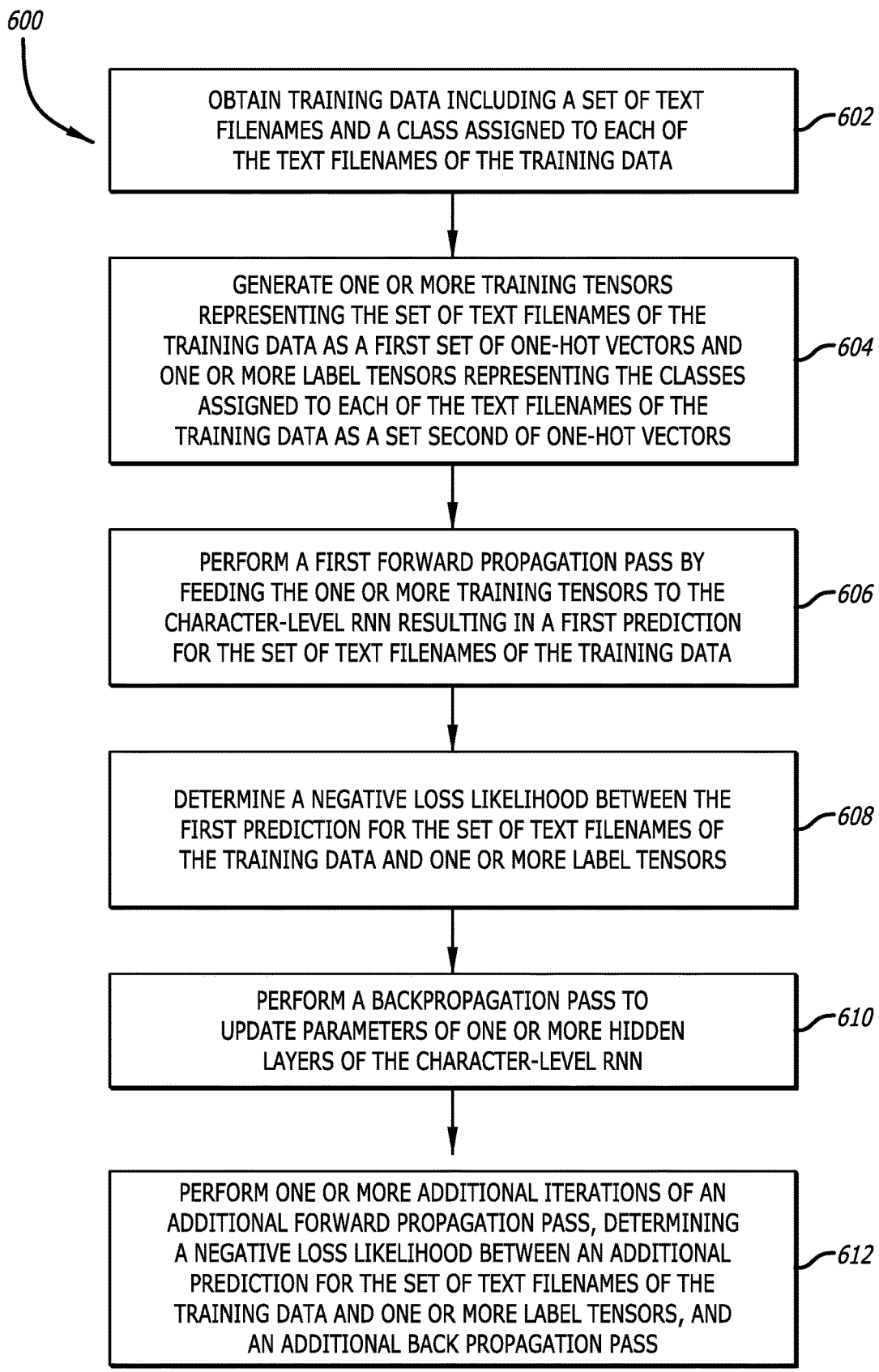
FIG. 6 is a flowchart illustrating example operations for training a character-level recurrent neural network configured to determine whether a filename is suspicious according to an implementation of the disclosure.

Referring now to FIG. 6, a flowchart illustrating example operations for training a character-level recurrent neural network configured to determine whether a filename is suspicious is shown according to an implementation of the disclosure. Each block illustrated in FIG. 6 represents an operation in the process 600 performed by, for example, a training classifier engine. It should be understood that not every operation illustrated in FIG. 6 is required. In fact, certain operations may be optional to complete aspects of the process 600. The discussion of the operations of process 600 includes may include reference to any of the figures provided herewith.

The process 600 begins with an operation of obtaining training data including a set of text filenames, wherein a class is assigned to each of the text filenames of the training data (block 602). In some implementations, two classes may be utilized, e.g., benign and suspicious. However, alternative names for the two classes may be utilized. Additionally, more than two classes may be provided in the training data, e.g., benign, suspicious, and highly suspicious. The utilization of more than three classes has also been considered. One or more training tensors are then generated that represent the set of text filenames of the training data as a first set of one-hot vectors and one or more labeled tensors are generated that represent the classes assigned to each of the text filenames of the training data as a second set of one-hot vectors (block 604).

The training process 600 then includes performing a first forward propagation pass by feeding the one or more training tensors to a character-level recurrent neural network (RNN), which results in a first prediction for the set of text filenames of the training data (block 606). An illustrative character-level RNN is shown in FIG. 3. A negative loss likelihood is then determined between the first prediction for the set of text filenames of the training data and the one or more label tensors (block 608). Following determination of the negative loss likelihood, a backpropagation pass is performed, which updates parameters of one or more hidden layers of the character-level RNN (block 610). Further, one or more iterations of the operations of a forward propagation pass, determining a negative loss likelihood, and a back propagation pass may be performed (block 612). As should be understood, additional iterations result in iterative adjustment of the parameters of the one or more hidden layers, which improves performance of the character-level RNN on subsequent (e.g., unseen) data.

Figure 7:
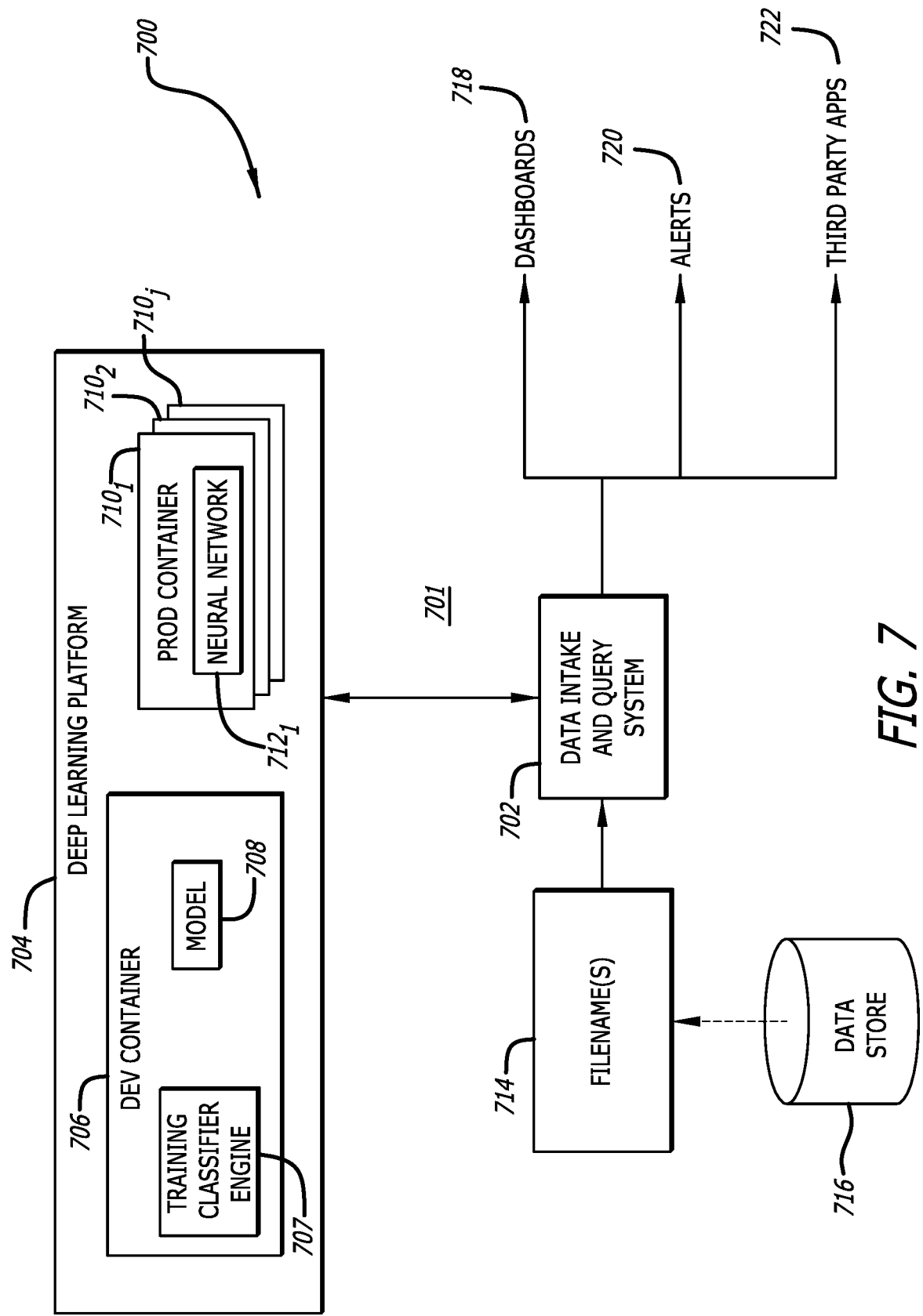
FIG. 7 is a block diagram illustrating a networked environment configured with network components and logic configured to obtain one or more filenames, analyze the one or more filenames, and determine whether the one or more filenames are suspicious according to an implementation of the disclosure.

Referring to FIG. 7, a block diagram illustrating a networked environment configured with network components and logic configured to obtain one or more filenames, analyze the one or more filenames, and determine whether the one or more filenames are suspicious is shown according to an implementation of the disclosure. The networked environment 700 includes several components including hardware and software that are communicatively coupled through a network 701, namely the internet, which may be represented by a public cloud or private cloud (not shown). As illustrated, the networked environment 700 includes a data intake and query system 702 communicatively coupled to a deep learning platform 704, which may include multiple containers such as a DEV container 706 and a plurality of PROD containers 7101-710; (collectively or individually "710").

The term container may refer to a standalone, executable software package configured to run one or more applications. For example, the DEV container 706 may be a software package configured to run on cloud computing resources and perform machine learning model training (e.g., a training classifier engine 707). Additionally, the PROD containers 710 may be software packages configured to run on cloud computing resources and execute a machine learning model on input provided by the data intake and query system 702. For example and as discussed below, the data intake and query system 702 may provide aspects of filenames 714 to a PROD container 710 that is configured to deploy a trained machine learning model resulting in a classification prediction (e.g., suspicious or benign) of a particular filename 714. An example model may be the neural network 7121 of the PROD container 7101. Filenames may also be stored in a datastore 716, such as an event field in the event data (discussed below) and provided to the data intake and query system 702 as a batch, e.g., multiple filenames. For instance, the data intake and query system 702 may execute a query that causes performance of operations to retrieve one or more filenames from the datastore 716 and initiate, e.g., begin, an analysis on the one or more filenames, such as through deployment of a machine learning model by the PROD container 710.

The analyses performed by either the data intake and query system 702 or the deep learning platform 704 may result in certain actions performed automatically including generation and display of a dashboard 718, generation and display or transmission of alerts 720, and/or generation of instructions for or actions performed on behalf of third-party application 722 (e.g., an email client such as the email client OUTLOOK® provided by Microsoft Corporation).

Figure 8:
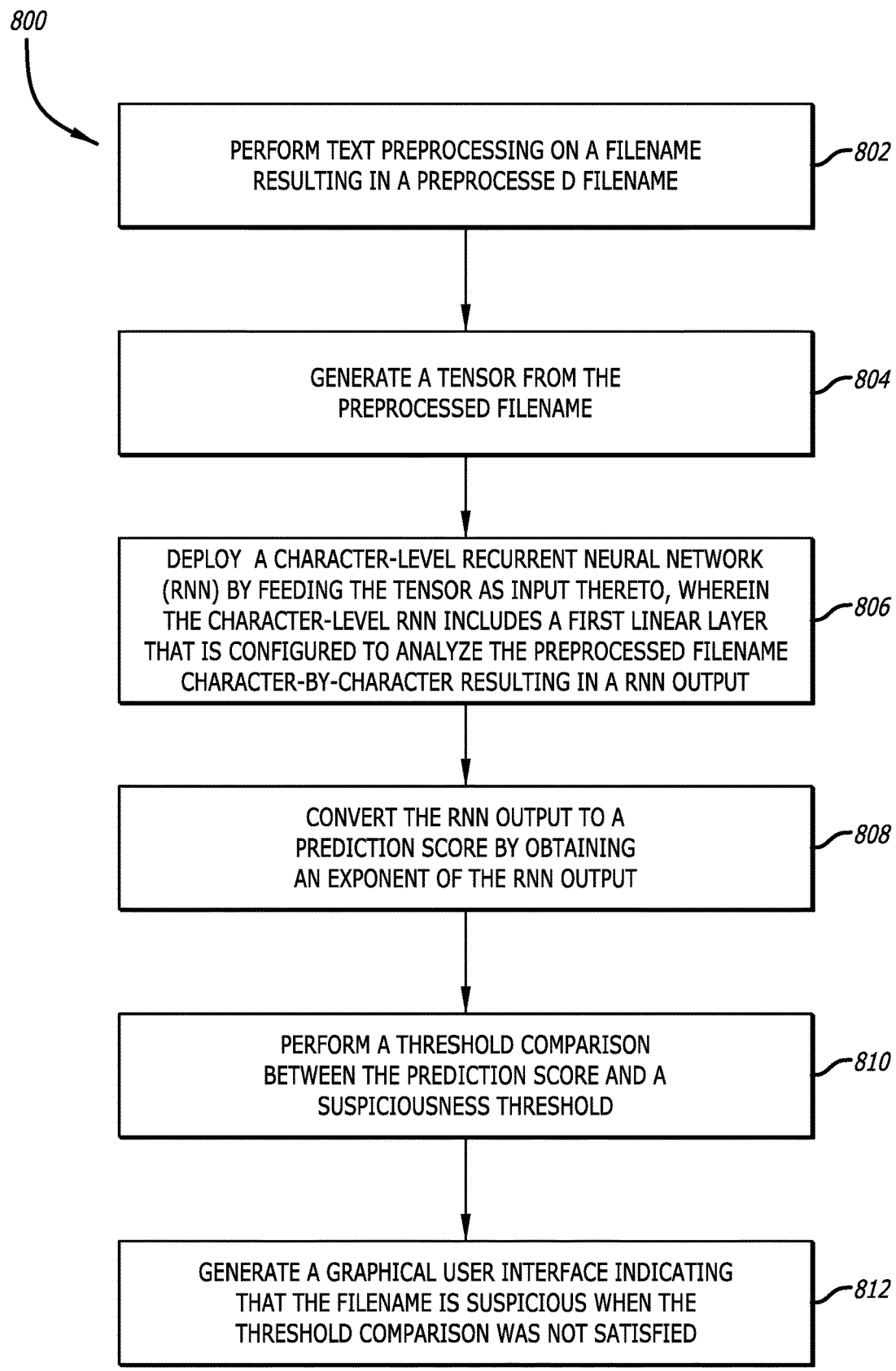
FIG. 8 is a flowchart illustrating example operations for deploying a character-level recurrent neural network to determine whether a filename is suspicious according to an implementation of the disclosure.

Referring to now FIG. 8, a flowchart illustrating an example process 800 for deploying a character-level recurrent neural network to determine whether a filename is suspicious is shown according to an implementation of the disclosure. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively, or additionally, the process 800 can be implemented using a non-transitory computer-readable medium storing instructions that, when executed by one or more processors, cause the one or more processors to perform the operations of the process 800 of FIG. 8.

Each block illustrated in FIG. 8 represents an operation of the process 800 where some operations of the process 800 may be optional. The process 800 begins with performing text pre-processing on a filename resulting in a pre-processed filename and generating a tensor from the pre-processed filename (blocks 802, 804). Following generation of the tensor, a character-level recurrent neural network (RNN) is deployed by feeding the tensor as input thereto, wherein the character-level RNN includes a first linear layer that is configured to analyze the pre-processed filename character-by-character resulting in a RNN output (block 806). The RNN output is then converted to a prediction score by obtaining an exponent of the RNN output and a threshold comparison is performed between the prediction score and a suspiciousness threshold (blocks 808, 810). A graphical user interface may then be generated indicating that the filename is suspicious when the threshold comparison was not satisfied (block 812).

In some implementations, the process further includes executing a pipelined search query resulting in retrieval of a set of filenames to be analyzed as being suspicious, wherein the filename is one of the set of filenames. In some instances, the text pre-processing includes extracting a process name, removing a file extension, converting the process name to lowercase, removing special characters and numbers, and removing character accents. In some implementations, generating the tensor includes encoding the pre-processed filename into a one-hot feature vector, and wherein the tensor has a size of <pre-processed filename length, batch size, number of possible characters>. In some examples, the batch size is 1, and the number of possible characters is 26.

In some implementations, the RNN output is a result of a softmax layer of the character-level RNN. Additionally, the process may include operations of obtaining training data including a set of text filenames and a class assigned to each of the text filenames of the training data; generating one or more training tensors representing the set of text filenames of the set of training as a first set of one-hot vectors and one or more label tensors representing the classes assigned to each of the text filenames of the training data as a set second of one-hot vectors; performing a first forward propagation pass by feeding the one or more training tensors to the character-level RNN resulting in a first prediction for the set of text filenames of the set of training; determining a negative loss likelihood between the first prediction for the set of text filenames of the set of training and one or more label tensors; performing a backpropagation pass to update parameters of one or more hidden layers of the character-level RNN; and performing one or more additional iterations of an additional forward propagation pass, determining a negative loss likelihood between an additional prediction for the set of text filenames of the set of training and one or more label tensors, and an additional back propagation pass.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 9:
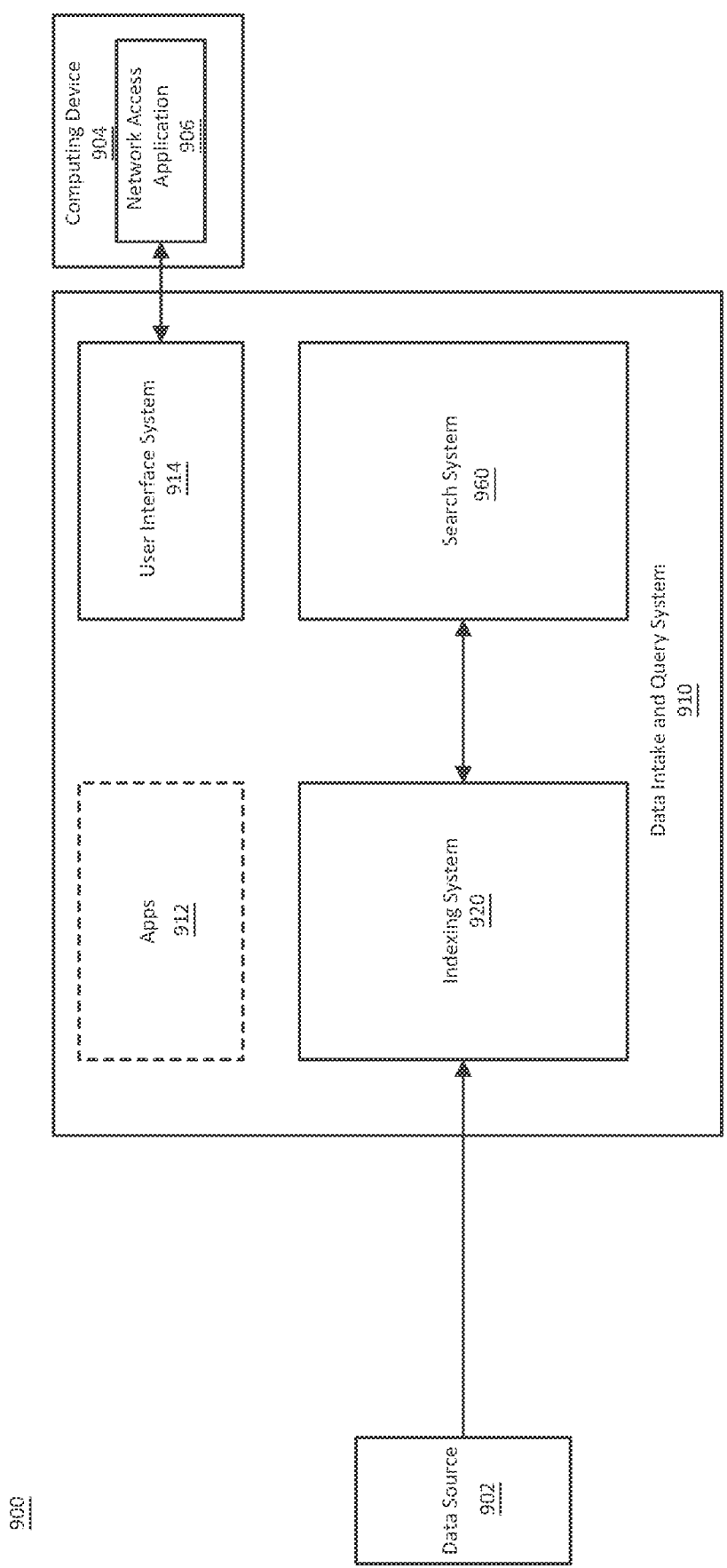
FIG. 9 is a block diagram illustrating an example computing environment that includes a data intake and query system according to an implementation of the disclosure.

FIG. 9 is a block diagram illustrating an example computing environment 900 that includes a data intake and query system 910. The data intake and query system 910 obtains data from a data source 902 in the computing environment 900, and ingests the data using an indexing system 920. A search system 960 of the data intake and query system 910 enables users to navigate the indexed data. Though drawn with separate boxes in FIG. 9, in some implementations the indexing system 920 and the search system 960 can have overlapping components. A computing device 904, running a network access application 906, can communicate with the data intake and query system 910 through a user interface system 914 of the data intake and query system 910. Using the computing device 904, a user can perform various operations with respect to the data intake and query system 910, such as administration of the data intake and query system 910, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 910 can further optionally include apps 912 that extend the search, analytics, and/or visualization capabilities of the data intake and query system 910.

The data intake and query system 910 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 910 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 910 can be executed on a single computing device, or execution of the program code can be distributed over multiple computing devices. For example, the program code can include instructions for both indexing and search components (which may be part of the indexing system 920 and/or the search system 960, respectively), which can be executed on a computing device that also provides the data source 902. As another example, the program code can be executed on one computing device, where execution of the program code provides both indexing and search components, while another copy of the program code executes on a second computing device that provides the data source 902. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 902 of the computing environment 900 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 902 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 920 obtains machine date from the data source 902 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 920 does not require prior knowledge of the structure of incoming data (e.g., the indexing system 920 does not need to be provided with a schema describing the data). Additionally, the indexing system 920 retains a copy of the data as it was received by the indexing system 920 such that the original data is always available for searching (e.g., no data is discarded, though, in some examples, the indexing system 920 can be configured to do so).

The search system 960 searches the data stored by the indexing 920 system. As discussed in greater detail below, the search system 960 enables users associated with the computing environment 900 (and possibly also other users) to navigate the data, generate reports, and visualize search results in "dashboards" output using a graphical interface. Using the facilities of the search system 960, users can obtain insights about the data, such as retrieving events from an index, calculating metrics, searching for specific conditions within a rolling time window, identifying patterns in the data, and predicting future trends, among other examples. To achieve greater efficiency, the search system 960 can apply map-reduce methods to parallelize searching of large volumes of data. Additionally, because the original data is available, the search system 960 can apply a schema to the data at search time. This allows different structures to be applied to the same data, or for the structure to be modified if or when the content of the data changes. Application of a schema at search time may be referred to herein as a late-binding schema technique.

The user interface system 914 provides mechanisms through which users associated with the computing environment 900 (and possibly others) can interact with the data intake and query system 910. These interactions can include configuration, administration, and management of the indexing system 920, initiation and/or scheduling of queries that are to be processed by the search system 960, receipt or reporting of search results, and/or visualization of search results. The user interface system 914 can include, for example, facilities to provide a command line interface or a web-based interface.

Users can access the user interface system 914 using a computing device 904 that communicates with data intake and query system 910, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 900. For example, a person can log in as a particular user and, using the user's digital information, can access the data intake and query system 910. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 904 can provide a human-machine interface through which a person can have a digital presence in the computing environment 900 in the form of a user. The computing device 904 is an electronic device having one or more processors and a memory capable of storing instructions for execution by the one or more processors. The computing device 904 can further include input/output (I/O) hardware and a network interface. Applications executed by the computing device 904 can include a network access application 906, such as a web browser, which can use a network interface of the client computing device 904 to communicate, over a network, with the user interface system 914 of the data intake and query system 910. The user interface system 914 can use the network access application 906 to generate user interfaces that enable a user to interact with the data intake and query system 910. A web browser is one example of a network access application. A shell tool can also be used as a network access application. In some examples, the data intake and query system 910 is an application executing on the computing device 906. In such examples, the network access application 906 can access the user interface system 914 without going over a network.

The data intake and query system 910 can optionally include apps 912. An app of the data intake and query system 910 is a collection of configurations, knowledge objects (a user-defined entity that enriches the data in the data intake and query system 910), views, and dashboards that may provide additional functionality, different techniques for searching the data, and/or additional insights into the data. The data intake and query system 910 can execute multiple applications simultaneously. Example applications include an information technology service intelligence application, which can monitor and analyze the performance and behavior of the computing environment 900, and an enterprise security application, which can include content and searches to assist security analysts in diagnosing and acting on anomalous or malicious behavior in the computing environment 900.

Though FIG. 9 illustrates only one data source, in practical implementations, the computing environment 900 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 900, the data intake and query system 910 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 900 can include on-prem and cloud-based computing resources, or only cloud-based resources. For example, an entity may have on-prem computing devices and a private cloud. In this example, the entity operates the data intake and query system 910 and can choose to execute the data intake and query system 910 on an on-prem computing device or in the cloud. In another example, a provider entity operates the data intake and query system 910 in a public cloud and provides the functionality of the data intake and query system 910 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 910. In some implementations, the entity providing the data intake and query system 910 is itself subscribing to the cloud services of a cloud service provider. As an example, a first entity provides computing resources under a public cloud service model, a second entity subscribes to the cloud services of the first provider entity and uses the cloud computing resources to operate the data intake and query system 910, and a third entity can subscribe to the services of the second provider entity in order to use the functionality of the data intake and query system 910. In this example, the data sources are associated with the third entity, users accessing the data intake and query system 910 are associated with the third entity, and the analytics and insights provided by the data intake and query system 910 are for purposes of the third entity's operations.

Figure 10:
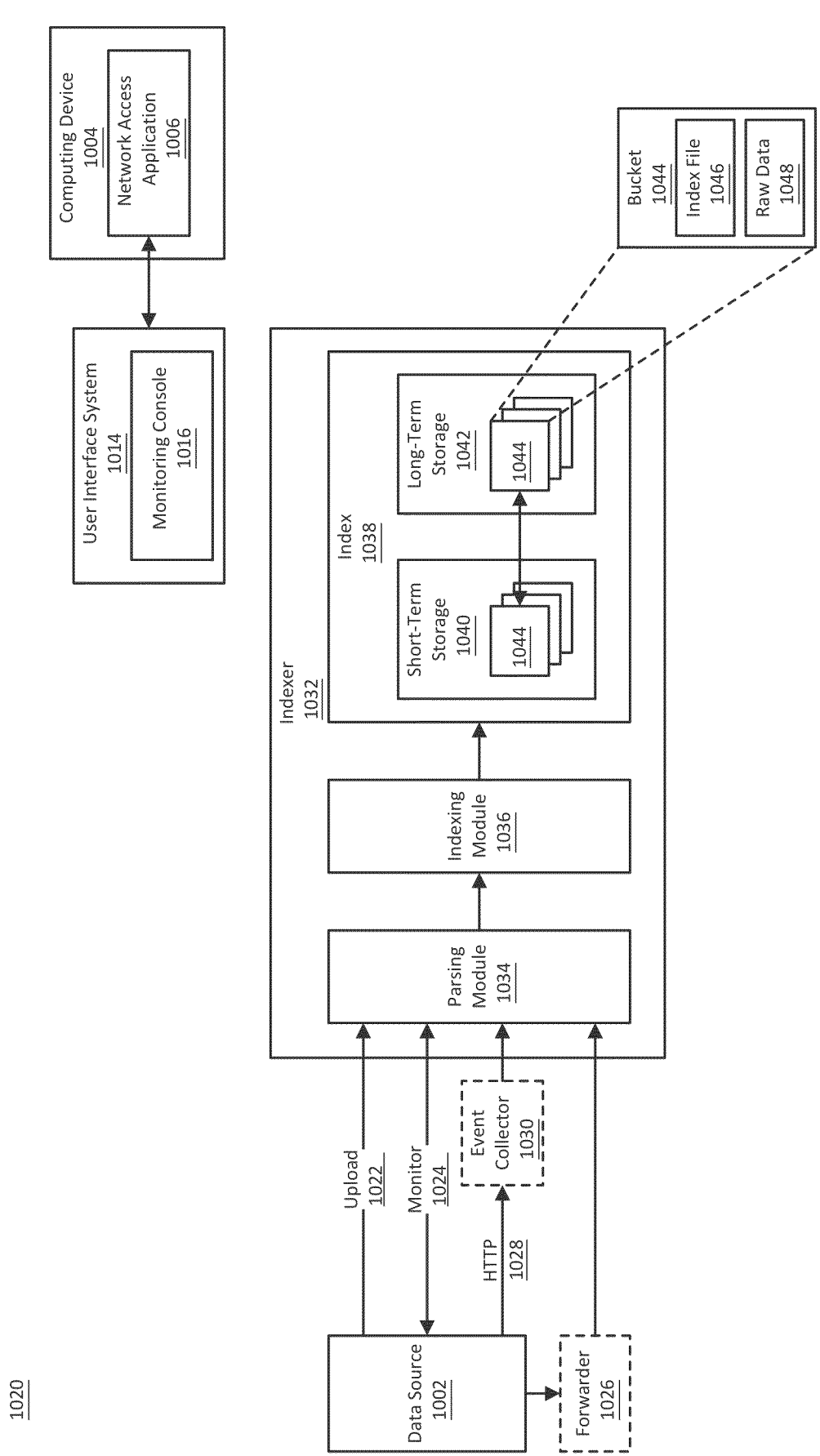
FIG. 10 is a block diagram illustrating in greater detail an example of an indexing system of a data intake and query system, such as the data intake and query system of FIG. 9 according to an implementation of the disclosure.

FIG. 10 is a block diagram illustrating in greater detail an example of an indexing system 1020 of a data intake and query system, such as the data intake and query system 910 of FIG. 9. The indexing system 1020 of FIG. 10 uses various methods to obtain machine data from a data source 1002 and stores the data in an index 1038 of an indexer 1032. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1020 enables the data intake and query system to obtain the machine data produced by the data source 1002 and to store the data for searching and retrieval.

Users can administer the operations of the indexing system 1020 using a computing device 1004 that can access the indexing system 1020 through a user interface system 1014 of the data intake and query system. For example, the computing device 1004 can be executing a network access application 1006, such as a web browser or a terminal, through which a user can access a monitoring console 1016 provided by the user interface system 1014. The monitoring console 1016 can enable operations such as: identifying the data source 1002 for data ingestion; configuring the indexer 1032 to index the data from the data source 1032; configuring a data ingestion method; configuring, deploying, and managing clusters of indexers; and viewing the topology and performance of a deployment of the data intake and query system, among other operations. The operations performed by the indexing system 1020 may be referred to as "index time" operations, which are distinct from "search time" operations that are discussed further below.

The indexer 1032, which may be referred to herein as a data indexing component, coordinates and performs most of the index time operations. The indexer 1032 can be implemented using program code that can be executed on a computing device. The program code for the indexer 1032 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1032. In some implementations, the indexer 1032 executes on the computing device 1004 through which a user can access the indexing system 1020. In some implementations, the indexer 1032 executes on a different computing device than the illustrated computing device 1004.

The indexer 1032 may be executing on the computing device that also provides the data source 1002 or may be executing on a different computing device. In implementations wherein the indexer 1032 is on the same computing device as the data source 1002, the data produced by the data source 1002 may be referred to as "local data." In other implementations the data source 1002 is a component of a first computing device and the indexer 1032 executes on a second computing device that is different from the first computing device. In these implementations, the data produced by the data source 1002 may be referred to as "remote data." In some implementations, the first computing device is "on-prem" and in some implementations the first computing device is "in the cloud." In some implementations, the indexer 1032 executes on a computing device in the cloud and the operations of the indexer 1032 are provided as a service to entities that subscribe to the services provided by the data intake and query system.

For a given data produced by the data source 1002, the indexing system 1020 can be configured to use one of several methods to ingest the data into the indexer 1032. These methods include upload 1022, monitor 1024, using a forwarder 1026, or using HyperText Transfer Protocol (HTTP 1028) and an event collector 1030. These and other methods for data ingestion may be referred to as "getting data in" (GDI) methods.

Using the upload 1022 method, a user can specify a file for uploading into the indexer 1032. For example, the monitoring console 1016 can include commands or an interface through which the user can specify where the file is located (e.g., on which computing device and/or in which directory of a file system) and the name of the file. The file may be located at the data source 1002 or maybe on the computing device where the indexer 1032 is executing. Once uploading is initiated, the indexer 1032 processes the file, as discussed further below. Uploading is a manual process and occurs when instigated by a user. For automated data ingestion, the other ingestion methods are used.

The monitor 1024 method enables the indexing system 1002 to monitor the data source 1002 and continuously or periodically obtain data produced by the data source 1002 for ingestion by the indexer 1032. For example, using the monitoring console 1016, a user can specify a file or directory for monitoring. In this example, the indexing system 1002 can execute a monitoring process that detects whenever the file or directory is modified and causes the file or directory contents to be sent to the indexer 1032. As another example, a user can specify a network port for monitoring. In this example, a monitoring process can capture data received at or transmitting from the network port and cause the data to be sent to the indexer 1032. In various examples, monitoring can also be configured for data sources such as operating system event logs, performance data generated by an operating system, operating system registries, operating system directory services, and other data sources.

Monitoring is available when the data source 1002 is local to the indexer 1032 (e.g., the data source 1002 is on the computing device where the indexer 1032 is executing). Other data ingestion methods, including forwarding and the event collector 1030, can be used for either local or remote data sources.

A forwarder 1026, which may be referred to herein as a data forwarding component, is a software process that sends data from the data source 1002 to the indexer 1032. The forwarder 1026 can be implemented using program code that can be executed on the computer device that provides the data source 1002. A user launches the program code for the forwarder 1026 on the computing device that provides the data source 1002. The user can further configure the forwarder 1026, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1026 can provide various capabilities. For example, the forwarder 1026 can send the data unprocessed or can perform minimal processing on the data before sending the data to the indexer 1032. Minimal processing can include, for example, adding metadata tags to the data to identify a source, source type, and/or host, among other information, dividing the data into blocks, and/or applying a timestamp to the data . . . . In some implementations, the forwarder 1026 can break the data into individual events (event generation is discussed further below) and send the events to a receiver. Other operations that the forwarder 1026 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1030 provides an alternate method for obtaining data from the data source 1002. The event collector 1030 enables data and application events to be sent to the indexer 1032 using HTTP 1028. The event collector 1030 can be implemented using program code that can be executing on a computing device. The program code may be a component of the data intake and query system or can be a standalone component that can be executed independently of the data intake and query system and operates in cooperation with the data intake and query system.

To use the event collector 1030, a user can, for example using the monitoring console 1016 or a similar interface provided by the user interface system 1014, enable the event collector 1030 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1002 as an alternative method to using a username and password for authentication.

To send data to the event collector 1030, the data source 1002 is supplied with a token and can then send HTTP 1028 requests to the event collector 1030. To send HTTP 1028 requests, the data source 1002 can be configured to use an HTTP client and/or to use logging libraries such as those supplied by Java, JavaScript, and .NET libraries. An HTTP client enables the data source 1002 to send data to the event collector 1030 by supplying the data, and a Uniform Resource Identifier (URI) for the event collector 1030 to the HTTP client. The HTTP client then handles establishing a connection with the event collector 1030, transmitting a request containing the data, closing the connection, and receiving an acknowledgment if the event collector 1030 sends one. Logging libraries enable HTTP 1028 requests to the event collector 1030 to be generated directly by the data source. For example, an application can include or link a logging library, and through functionality provided by the logging library manage establishing a connection with the event collector 1030, transmitting a request, and receiving an acknowledgement.

An HTTP 1028 request to the event collector 1030 can contain a token, a channel identifier, event metadata, and/or event data. The token authenticates the request with the event collector 1030. The channel identifier, if available in the indexing system 1020, enables the event collector 1030 to segregate and keep separate data from different data sources. The event metadata can include one or more key-value pairs that describe the data source 1002 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1030 extracts events from HTTP 1028 requests and sends the events to the indexer 1032. The event collector 1030 can further be configured to send events to one or more indexers. Extracting the events can include associating any metadata in a request with the event or events included in the request. In these implementations, event generation by the indexer 1032 (discussed further below) is bypassed, and the indexer 1032 moves the events directly to indexing. In some implementations, the event collector 1030 extracts event data from a request and outputs the event data to the indexer 1032, and the indexer generates events from the event data. In some implementations, the event collector 1030 sends an acknowledgement message to the data source 1002 to indicate that the event collector 1030 has received a particular request form the data source 1002, and/or to indicate to the data source 1002 that events in the request have been added to an index.

The indexer 1032 ingests incoming data and transforms the data into searchable knowledge in the form of events. In the data intake and query system, an event is a single piece of data that represents activity of the component represented in FIG. 10 by the data source 1002. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1032 can include a parsing module 1034 and an indexing module 1036 for generating and storing the events. The parsing module 1034 and indexing module 1036 can be modular and pipelined, such that one component can be operating on a first set of data while the second component is simultaneously operating on a second sent of data. Additionally, the indexer 1032 may at any time have multiple instances of the parsing module 1034 and indexing module 1036, with each set of instances configured to simultaneously operate on data from the same data source or from different data sources. The parsing module 1034 and indexing module 1036 are illustrated in FIG. 10 to facilitate discussion, with the understanding that implementations with other components are possible to achieve the same functionality.

The parsing module 1034 determines information about incoming event data, where the information can be used to identify events within the event data. For example, the parsing module 1034 can associate a source type with the event data. A source type identifies the data source 1002 and describes a possible data structure of event data produced by the data source 1002. For example, the source type can indicate which fields to expect in events generated at the data source 1002 and the keys for the values in the fields, and possibly other information such as sizes of fields, an order of the fields, a field separator, and so on. The source type of the data source 1002 can be specified when the data source 1002 is configured as a source of event data. Alternatively, the parsing module 1034 can determine the source type from the event data, for example from an event field in the event data or using machine learning techniques applied to the event data.

Other information that the parsing module 1034 can determine includes timestamps. In some cases, an event includes a timestamp as a field, and the timestamp indicates a point in time when the action represented by the event occurred or was recorded by the data source 1002 as event data. In these cases, the parsing module 1034 may be able to determine from the source type associated with the event data that the timestamps can be extracted from the events themselves. In some cases, an event does not include a timestamp and the parsing module 1034 determines a timestamp for the event, for example from a name associated with the event data from the data source 1002 (e.g., a file name when the event data is in the form of a file) or a time associated with the event data (e.g., a file modification time).

As another example, when the parsing module 1034 is not able to determine a timestamp from the event data, the parsing module 1034 may use the time at which it is indexing the event data. As another example, the parsing module 1034 can use a user-configured rule to determine the timestamps to associate with events.

The parsing module 1034 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1034 may be able to determine event boundaries from the source type associated with the event data, for example from a data structure indicated by the source type. In some implementations, a user can configure rules the parsing module 1034 can use to identify event boundaries.

The parsing module 1034 can further extract data from events and possibly also perform transformations on the events. For example, the parsing module 1034 can extract a set of fields (key-value pairs) for each event, such as a host or hostname, source or source name, and/or source type. The parsing module 1034 may extract certain fields by default or based on a user configuration. Alternatively or additionally, the parsing module 1034 may add fields to events, such as a source type or a user-configured field. As another example of a transformation, the parsing module 1034 can anonymize fields in events to mask sensitive information, such as social security numbers or account numbers. Anonymizing fields can include changing or replacing values of specific fields. The parsing component 1034 can further perform user-configured transformations.

The parsing module 1034 outputs the results of processing incoming event data to the indexing module 1036, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1032 can be configured to identify searchable segments that are parts of fields, searchable segments that are entire fields, or both. The parsing module 1034 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1046, to find event data that matches a search query. In some implementations, segmentation can alternatively be performed by the forwarder 1026. Segmentation can also be disabled, in which case the indexer 1032 will not build a lexicon for the event data. When segmentation is disabled, the search system searches the event data directly.

Building index data structures generates the index 1038. The index 1038 is a storage data structure on a storage device (e.g., a disk drive or other physical device for storing digital data). The storage device may be a component of the computing device on which the indexer 1032 is operating (referred to herein as local storage) or may be a component of a different computing device (referred to herein as remote storage) that the indexer 1038 has access to over a network. The indexer 1032 can manage more than one index and can manage indexes of different types. For example, the indexer 1032 can manage event indexes, which impose minimal structure on stored data and can accommodate any type of data. As another example, the indexer 1032 can manage metrics indexes, which use a highly structured format to handle the higher volume and lower latency demands associated with metrics data.

The indexing module 1036 organizes files in the index 1038 in directories referred to as buckets. The files in a bucket 1044 can include raw data files, index files, and possibly also other metadata files. As used herein, "raw data" means data as when the data was produced by the data source 1002, without alteration to the format or content. As noted previously, the parsing component 1034 may add fields to event data and/or perform transformations on fields in the event data. Event data that has been altered in this way is referred to herein as enriched data. A raw data file 1048 can include enriched data, in addition to or instead of raw data. The raw data file 1048 may be compressed to reduce disk usage. An index file 1046, which may also be referred to herein as a "time-series index" or tsidx file, contains metadata that the indexer 1032 can use to search a corresponding raw data file 1048. As noted above, the metadata in the index file 1046 includes a lexicon of the event data, which associates each unique keyword in the event data with a reference to the location of event data within the raw data file 1048. The keyword data in the index file 1046 may also be referred to as an inverted index. In various implementations, the data intake and query system can use index files for other purposes, such as to store data summarizations that can be used to accelerate searches.

A bucket 1044 includes event data for a particular range of time. The indexing module 1036 arranges buckets in the index 1038 according to the age of the buckets, such that buckets for more recent ranges of time are stored in short-term storage 1040 and buckets for less recent ranges of time are stored in long-term storage 1042. Short-term storage 1040 may be faster to access while long-term storage 1042 may be slower to access. Buckets may be moves from short-term storage 1040 to long-term storage 1042 according to a configurable data retention policy, which can indicate at what point in time a bucket is old enough to be moved.

A bucket's location in short-term storage 1040 or long-term storage 1042 can also be indicated by the bucket's status. As an example, a bucket's status can be "hot," "warm," "cold," "frozen," or "thawed." In this example, hot bucket is one to which the indexer 1032 is writing data and the bucket becomes a warm bucket when the index 1032 stops writing data to it. In this example, both hot and warm buckets reside in short-term storage 1040. Continuing this example, when a warm bucket is moved to long-term storage 1042, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1020 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1020 through the monitoring console 1016 provided by the user interface system 1014. Using the monitoring console 1016, the user can configure and monitor an index cluster, and see information such as disk usage by an index, volume usage by an indexer, index and volume size over time, data age, statistics for bucket types, and bucket settings, among other information.

Figure 11:
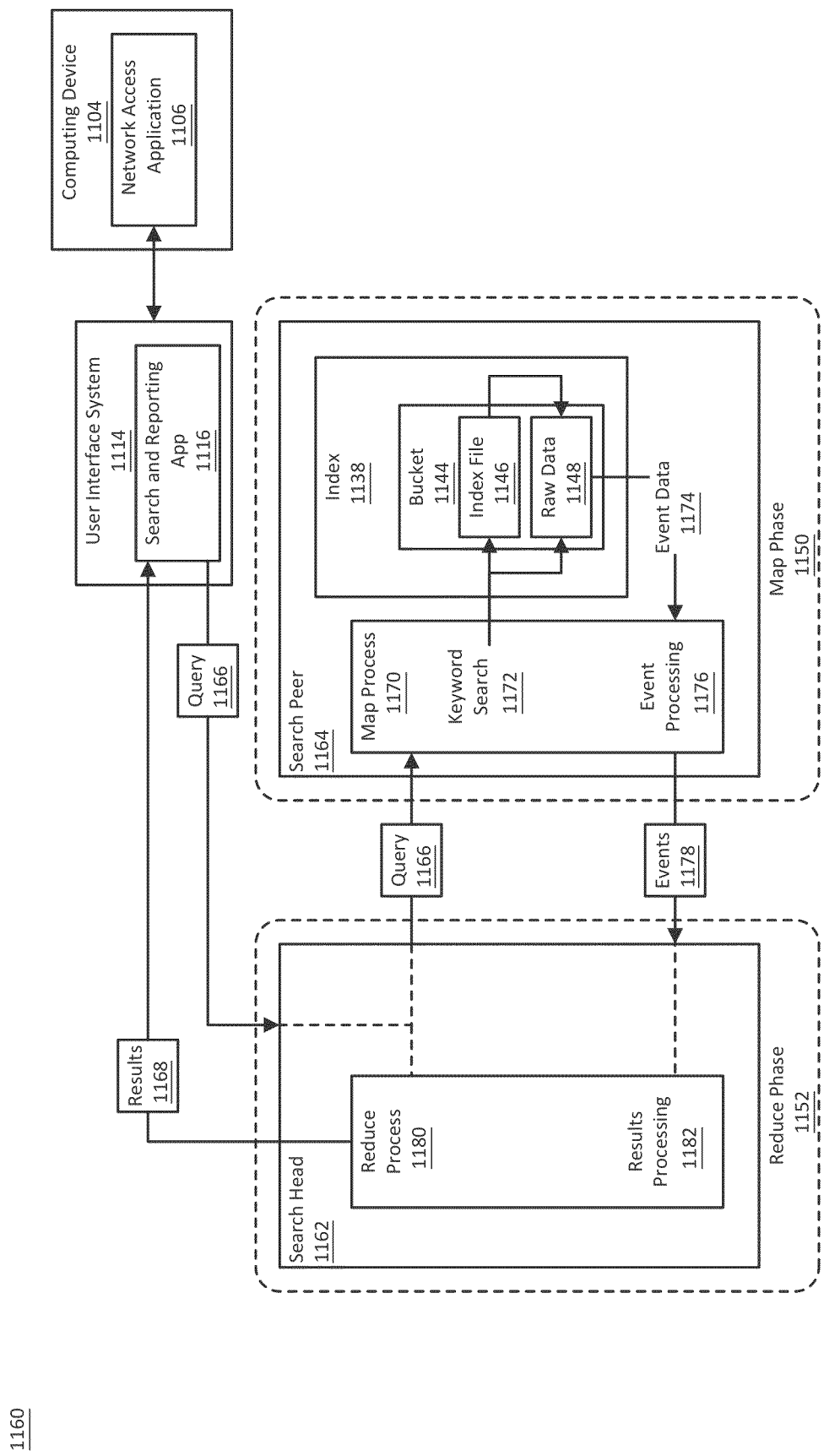
FIG. 11 is a block diagram illustrating in greater detail an example of the search system of a data intake and query system, such as the data intake and query system of FIG. 9 according to an implementation of the disclosure.

FIG. 11 is a block diagram illustrating in greater detail an example of the search system 1160 of a data intake and query system, such as the data intake and query system 910 of FIG. 9. The search system 1160 of FIG. 11 issues a query 1166 to a search head 1162, which sends the query 1166 to a search peer 1164. Using a map process 1170, the search peer 1164 searches the appropriate index 1138 for events identified by the query 1166 and sends events 1178 so identified back to the search head 1162. Using a reduce process 1182, the search head 1162 processes the events 1178 and produces results 1168 to respond to the query 1166. The results 1168 can provide useful insights about the data stored in the index 1138. These insights can aid in the administration of information technology systems, in security analysis of information technology systems, and/or in analysis of the development environment provided by information technology systems.

The query 1166 that initiates a search is produced by a search and reporting app 1116 that is available through the user interface system 1114 of the data intake and query system. Using a network access application 1106 executing on a computing device 1104, a user can input the query 1166 into a search field provided by the search and reporting app 1116. Alternatively or additionally, the search and reporting app 1116 can include pre-configured queries or stored queries that can be activated by the user. In some cases, the search and reporting app 1116 initiates the query 1166 when the user enters the query 1166. In these cases, the query 1166 maybe referred to as an "ad-hoc" query. In some cases, the search and reporting app 1116 initiates the query 1166 based on a schedule. For example, the search and reporting app 1116 can be configured to execute the query 1166 once per hour, once per day, at a specific time, on a specific date, or at some other time that can be specified by a date, time, and/or frequency. These types of queries maybe referred to as scheduled queries.

The query 1166 is specified using a search processing language. The search processing language includes commands or search terms that the search peer 1164 will use to identify events to return in the search results 1168. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1166 to include sequential commands, where a subsequent command may operate on the results of a prior command. As an example, sequential commands may be separated in the query 1166 by a vertical line ("|" or "pipe") symbol.

In addition to one or more search commands, the query 1166 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1166 occurs in two broad phases: a map phase 1150 and a reduce phase 1152. The map phase 1150 takes place across one or more search peers. In the map phase 1150, the search peers locate event data that matches the search terms in the search query 1166 and sorts the event data into field-value pairs. When the map phase 1150 is complete, the search peers send events that they have found to one or more search heads for the reduce phase 1152. During the reduce phase 1152, the search heads process the events through commands in the search query 1166 and aggregate the events to produce the final search results 1168.

A search head, such as the search head 1162 illustrated in FIG. 11, is a component of the search system 1160 that manages searches. The search head 1162, which may also be referred to herein as a search management component, can be implemented using program code that can be executed on a computing device. The program code for the search head 1162 can be stored on a non-transitory computer-readable medium and from this medium can be loaded or copied to the memory of a computing device. One or more hardware processors of the computing device can read the program code from the memory and execute the program code in order to implement the operations of the search head 1162.

Upon receiving the search query 1166, the search head 1162 directs the query 1166 to one or more search peers, such as the search peer 1164 illustrated in FIG. 11. "Search peer" is an alternate name for "indexer" and a search peer may be largely similar to the indexer described previously. The search peer 1164 may be referred to as a "peer node" when the search peer 1164 is part of an indexer cluster. The search peer 1164, which may also be referred to as a search execution component, can be implemented using program code that can be executed on a computing device. In some implementations, one set of program code implements both the search head 1162 and the search peer 1164 such that the search head 1162 and the search peer 1164 form one component. In some implementations, the search head 1162 is an independent piece of code that performs searching and no indexing functionality. In these implementations, the search head 1162 may be referred to as a dedicated search head.

The search head 1162 may consider multiple criteria when determining whether to send the query 1166 to the particular search peer 1164. For example, the search system 1160 may be configured to include multiple search peers that each have duplicative copies of at least some of the event data and are implanted using different hardware resources q. In this example, the sending the search query 1166 to more than one search peer allows the search system 1160 to distribute the search workload across different hardware resources. As another example, search system 1160 may include different search peers for different purposes (e.g., one has an index storing a first type of data or from a first data source while a second has an index storing a second type of data or from a second data source). In this example, the search query 1166 may specify which indexes to search, and the search head 1162 will send the query 1166 to the search peers that have those indexes.

To identify events 1178 to send back to the search head 1162, the search peer 1164 performs a map process 1170 to obtain event data 1174 from the index 1138 that is maintained by the search peer 1164. During a first phase of the map process 1170, the search peer 1164 identifies buckets that have events that are described by the time indicator in the search query 1166. As noted above, a bucket contains events whose timestamps fall within a particular range of time. For each bucket 1144 whose events can be described by the time indicator, during a second phase of the map process 1170, the search peer 1164 performs a keyword search 1174 using search terms specified in the search query 1166. The search terms can be one or more of keywords, phrases, fields, Boolean expressions, and/or comparison expressions that in combination describe events being searched for. When segmentation is enabled at index time, the search peer 1164 performs the keyword search 1172 on the bucket's index file 1146. As noted previously, the index file 1146 includes a lexicon of the searchable terms in the events stored in the bucket's raw data 1148 file. The keyword search 1172 searches the lexicon for searchable terms that correspond to one or more of the search terms in the query 1166. As also noted above, the lexicon incudes, for each searchable term, a reference to each location in the raw data 1148 file where the searchable term can be found. Thus, when the keyword search identifies a searchable term in the index file 1146 that matches a search term in the query 1166, the search peer 1164 can use the location references to extract from the raw data 1148 file the event data 1174 for each event that include the searchable term.

In cases where segmentation was disabled at index time, the search peer 1164 performs the keyword search 1172 directly on the raw data 1148 file. To search the raw data 1148, the search peer 1164 may identify searchable segments in events in a similar manner as when the data was indexed. Thus, depending on how the search peer 1164 is configured, the search peer 1164 may look at event fields and/or parts of event fields to determine whether an event matches the query 1166. Any matching events can be added to the event data 1174 read from the raw data 1148 file. The search peer 1164 can further be configured to enable segmentation at search time, so that searching of the index 1138 causes the search peer 1164 to build a lexicon in the index file 1146.

The event data 1174 obtained from the raw data 1148 file includes the full text of each event found by the keyword search 1172. During a third phase of the map process 1170, the search peer 1164 performs event processing 1176 on the event data 1174, with the steps performed being determined by the configuration of the search peer 1164 and/or commands in the search query 1166. For example, the search peer 1164 can be configured to perform field discovery and field extraction. Field discovery is a process by which the search peer 1164 identifies and extracts key-value pairs from the events in the event data 1174. The search peer 1164 can, for example, be configured to automatically extract the first 100 fields (or another number of fields) in the event data 1174 that can be identified as key-value pairs. As another example, the search peer 1164 can extract any fields explicitly mentioned in the search query 1166. The search peer 1164 can, alternatively or additionally, be configured with particular field extractions to perform.

Other examples of steps that can be performed during event processing 1176 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1164 sends processed events 1178 to the search head 1162, which performs a reduce process 1180. The reduce process 1180 potentially receives events from multiple search peers and performs various results processing 1182 steps on the received events. The results processing 1182 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1182 can further include applying commands from the search query 1166 to the events. The query 1166 can include, for example, commands for evaluating and/or manipulating fields (e.g., to generate new fields from existing fields or parse fields that have more than one value). As another example, the query 1166 can include commands for calculating statistics over the events, such as counts of the occurrences of fields, or sums, averages, ranges, and so on, of field values. As another example, the query 1166 can include commands for generating statistical values for purposes of generating charts of graphs of the events.

The reduce process 1180 outputs the events found by the search query 1166, as well as information about the events. The search head 1162 transmits the events and the information about the events as search results 1168, which are received by the search and reporting app 1116. The search and reporting app 1116 can generate visual interfaces for viewing the search results 1168. The search and reporting app 1116 can, for example, output visual interfaces for the network access application 1106 running on a computing device 1104 to generate.

The visual interfaces can include various visualizations of the search results 1168, such as tables, line or area charts, Choropleth maps, or single values. The search and reporting app 1116 can organize the visualizations into a dashboard, where the dashboard includes a panel for each visualization. A dashboard can thus include, for example, a panel listing the raw event data for the events in the search results 1168, a panel listing fields extracted at index time and/or found through field discovery along with statistics for those fields, and/or a timeline chart indicating how many events occurred at specific points in time (as indicated by the timestamps associated with each event). In various implementations, the search and reporting app 1116 can provide one or more default dashboards. Alternatively or additionally, the search and reporting app 1116 can include functionality that enables a user to configure custom dashboards.

The search and reporting app 1116 can also enable further investigation into the events in the search results 1116. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1166. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 12:
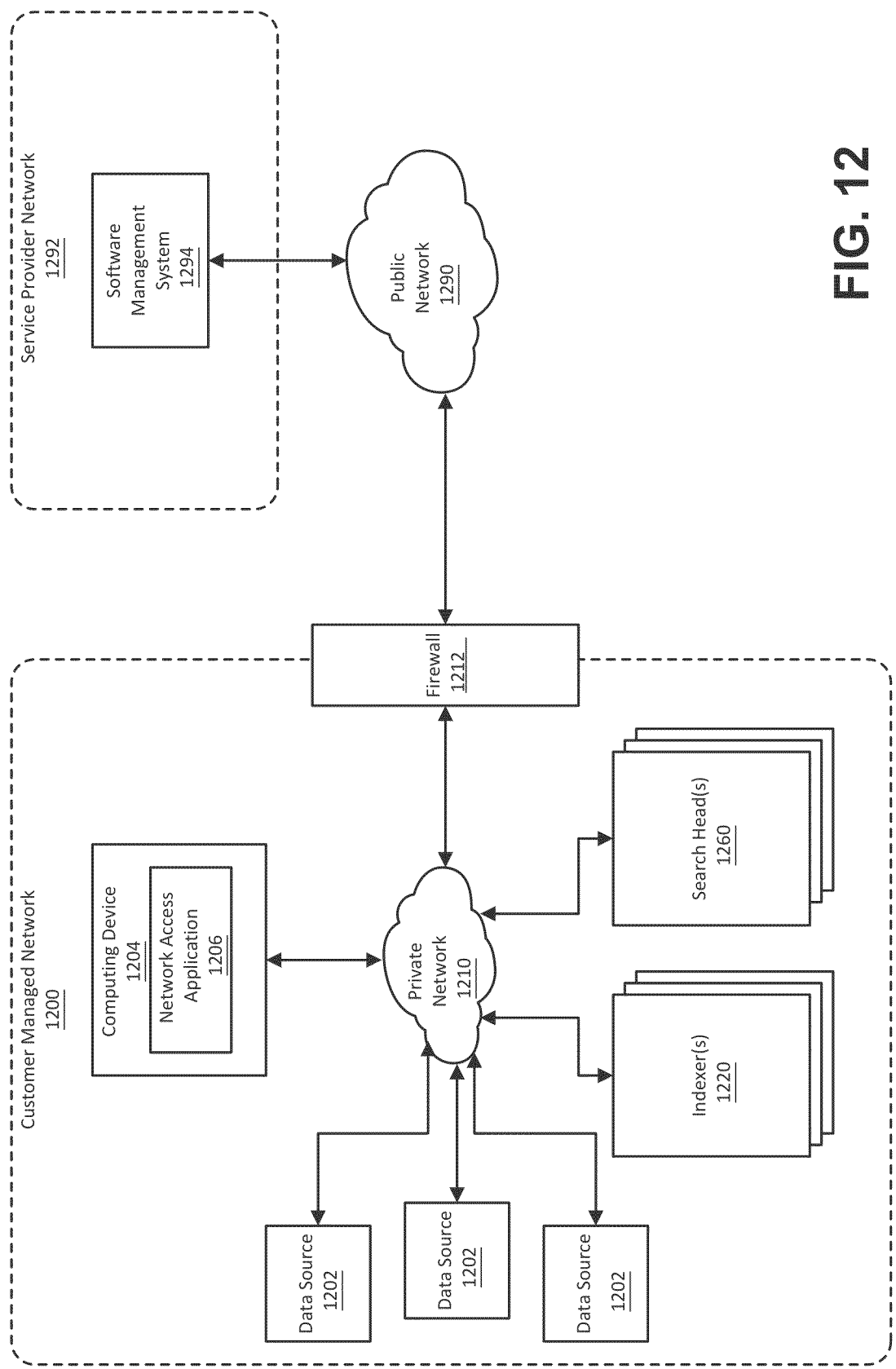
FIG. 12 illustrates an example of a self-managed network 1200 that includes a data intake and query system according to an implementation of the disclosure.

FIG. 12 illustrates an example of a self-managed network 1200 that includes a data intake and query system. "Self-managed" in this instance means that the entity that is operating the self-managed network 1200 configures, administers, maintains, and/or operates the data intake and query system using its own compute resources and people. Further, the self-managed network 1200 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1200 is located within the customer's on-prem environment, such as in the entity's data center, the operation and management of the self-managed network 1200, including of the resources in the self-managed network 1200, is under the control of the entity. For example, administrative personnel of the entity have complete access to and control over the configuration, management, and security of the self-managed network 1200 and its resources.

The self-managed network 1200 can execute one or more instances of the data intake and query system. An instance of the data intake and query system may be executed by one or more computing devices that are part of the self-managed network 1200. A data intake and query system instance can comprise an indexing system and a search system, where the indexing system includes one or more indexers 1220 and the search system includes one or more search heads 1260.

As depicted in FIG. 12, the self-managed network 1200 can include one or more data sources 1202. Data received from these data sources may be processed by an instance of the data intake and query system within self-managed network 1200. The data sources 1202 and the data intake and query system instance can be communicatively coupled to each other via a private network 1210.

Users associated with the entity can interact with and avail themselves of the functions performed by a data intake and query system instance using computing devices. As depicted in FIG. 12, a computing device 1204 can execute a network access application 1206 (e.g., a web browser), that can communicate with the data intake and query system instance and with data sources 1202 via the private network 1210. Using the computing device 1204, a user can perform various operations with respect to the data intake and query system, such as management and administration of the data intake and query system, generation of knowledge objects, and other functions. Results generated from processing performed by the data intake and query system instance may be communicated to the computing device 1204 and output to the user via an output system (e.g., a screen) of the computing device 1204.

The self-managed network 1200 can also be connected to other networks that are outside the entity's on-premise environment/network, such as networks outside the entity's data center. Connectivity to these other external networks is controlled and regulated through one or more layers of security provided by the self-managed network 1200. One or more of these security layers can be implemented using firewalls 1212. The firewalls 1212 form a layer of security around the self-managed network 1200 and regulate the transmission of traffic from the self-managed network 1200 to the other networks and from these other networks to the self-managed network 1200.

Networks external to the self-managed network can include various types of networks including public networks 1290, other private networks, and/or cloud networks provided by one or more cloud service providers. An example of a public network 1290 is the Internet. In the example depicted in FIG. 12, the self-managed network 1200 is connected to a service provider network 1292 provided by a cloud service provider via the public network 1290.

In some implementations, resources provided by a cloud service provider may be used to facilitate the configuration and management of resources within the self-managed network 1200. For example, configuration and management of a data intake and query system instance in the self-managed network 1200 may be facilitated by a software management system 1294 operating in the service provider network 1292. There are various ways in which the software management system 1294 can facilitate the configuration and management of a data intake and query system instance within the self-managed network 1200. As one example, the software management system 1294 may facilitate the download of software including software updates for the data intake and query system. In this example, the software management system 1294 may store information indicative of the versions of the various data intake and query system instances present in the self-managed network 1200. When a software patch or upgrade is available for an instance, the software management system 1294 may inform the self-managed network 1200 of the patch or upgrade. This can be done via messages communicated from the software management system 1294 to the self-managed network 1200.

The software management system 1294 may also provide simplified ways for the patches and/or upgrades to be downloaded and applied to the self-managed network 1200. For example, a message communicated from the software management system 1294 to the self-managed network 1200 regarding a software upgrade may include a Uniform Resource Identifier (URI) that can be used by a system administrator of the self-managed network 1200 to download the upgrade to the self-managed network 1200. In this manner, management resources provided by a cloud service provider using the service provider network 1292 and which are located outside the self-managed network 1200 can be used to facilitate the configuration and management of one or more resources within the entity's on-prem environment. In some implementations, the download of the upgrades and patches may be automated, whereby the software management system 1294 is authorized to, upon determining that a patch is applicable to a data intake and query system instance inside the self-managed network 1200, automatically communicate the upgrade or patch to self-managed network 1200 and cause it to be installed within self-managed network 1200.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
performing text pre-processing on a filename resulting in a pre-processed filename;
generating a tensor from the pre-processed filename;
deploying a character-level recurrent neural network (RNN) by feeding the tensor as input thereto, wherein the character-level RNN includes a first linear layer that is configured to analyze the pre-processed filename character-by-character resulting in a RNN output;
converting the RNN output to a prediction score by obtaining an exponent of the RNN output;
performing a threshold comparison between the prediction score and a suspiciousness threshold; and
generating a graphical user interface indicating that the filename is suspicious when the threshold comparison was not satisfied.

2. The method of claim 1, further comprising:
executing a pipelined search query resulting in retrieval of a set of filenames to be analyzed as being suspicious, wherein the filename is one of the set of filenames.

3. The method of claim 1, wherein text pre-processing includes extracting a process name, removing a file extension, converting the process name to lowercase, removing special characters and numbers, and removing character accents.

4. The method of claim 1, wherein generating the tensor includes encoding the pre-processed filename into a one-hot feature vector, and wherein the tensor has a size of <pre-processed filename length, batch size, number of possible characters>.

5. The method of claim 4, wherein the batch size is 1, and the number of possible characters is 26.

6. The method of claim 1, wherein the RNN output is a result of a softmax layer of the character-level RNN.

7. The method of claim 1, further comprising:
obtaining training data including a set of text filenames and a class assigned to each of the text filenames of the training data;
generating one or more training tensors representing the set of text filenames of the set of training as a first set of one-hot vectors and one or more label tensors representing the classes assigned to each of the text filenames of the training data as a set second of one-hot vectors;
performing a first forward propagation pass by feeding the one or more training tensors to the character-level RNN resulting in a first prediction for the set of text filenames of the set of training;
determining a negative loss likelihood between the first prediction for the set of text filenames of the set of training and one or more label tensors;
performing a backpropagation pass to update parameters of one or more hidden layers of the character-level RNN; and
performing one or more additional iterations of an additional forward propagation pass, determining a negative loss likelihood between an additional prediction for the set of text filenames of the set of training and one or more label tensors, and an additional back propagation pass.

8. A computing device, comprising:
a processor; and
a non-transitory computer-readable medium having stored thereon instructions that, when executed by the processor, cause the processor to perform operations including:

performing text pre-processing on a filename resulting in a pre-processed filename;

generating a tensor from the pre-processed filename;

deploying a character-level recurrent neural network (RNN) by feeding the tensor as input thereto, wherein the character-level RNN includes a first linear layer that is configured to analyze the pre-processed filename character-by-character resulting in a RNN output;

converting the RNN output to a prediction score by obtaining an exponent of the RNN output;

performing a threshold comparison between the prediction score and a suspiciousness threshold; and generating a graphical user interface indicating that the filename is suspicious when the threshold comparison was not satisfied.

9. The computing device of claim 8, wherein the operations further include:

executing a pipelined search query resulting in retrieval of a set of filenames to be analyzed as being suspicious, wherein the filename is one of the set of filenames.

10. The computing device of claim 8, wherein text pre-processing includes extracting a process name, removing a file extension, converting the process name to lowercase, removing special characters and numbers, and removing character accents.

11. The computing device of claim 8, wherein generating the tensor includes encoding the pre-processed filename into a one-hot feature vector, and wherein the tensor has a size of <pre-processed filename length, batch size, number of possible characters>.

12. The computing device of claim 11, wherein the batch size is 1, and the number of possible characters is 26.

13. The computing device of claim 8, wherein the RNN output is a result of a softmax layer of the character-level RNN.

14. The computing device of claim 8, wherein the operations further include:

obtaining training data including a set of text filenames and a class assigned to each of the text filenames of the training data;

generating one or more training tensors representing the set of text filenames of the set of training as a first set of one-hot vectors and one or more label tensors representing the classes assigned to each of the text filenames of the training data as a set second of one-hot vectors;

performing a first forward propagation pass by feeding the one or more training tensors to the character-level RNN resulting in a first prediction for the set of text filenames of the set of training;

determining a negative loss likelihood between the first prediction for the set of text filenames of the set of training and one or more label tensors;

performing a backpropagation pass to update parameters of one or more hidden layers of the character-level RNN; and performing one or more additional iterations of an additional forward propagation pass, determining a negative loss likelihood between an additional prediction for the set of text filenames of the set of training and one or more label tensors, and an additional back propagation pass.

15. A non-transitory computer-readable medium having stored thereon instructions that, when executed by one or more processors, cause the one or more processor to perform operations including:

performing text pre-processing on a filename resulting in a pre-processed filename;

generating a tensor from the pre-processed filename;

deploying a character-level recurrent neural network (RNN) by feeding the tensor as input thereto, wherein the character-level RNN includes a first linear layer that is configured to analyze the pre-processed filename character-by-character resulting in a RNN output;

converting the RNN output to a prediction score by obtaining an exponent of the RNN output;

performing a threshold comparison between the prediction score and a suspiciousness threshold; and generating a graphical user interface indicating that the filename is suspicious when the threshold comparison was not satisfied.

16. The non-transitory computer-readable medium of claim 15, wherein the operations further include:

executing a pipelined search query resulting in retrieval of a set of filenames to be analyzed as being suspicious, wherein the filename is one of the set of filenames.

17. The non-transitory computer-readable medium of claim 15, wherein text pre-processing includes extracting a process name, removing a file extension, converting the process name to lowercase, removing special characters and numbers, and removing character accents.

18. The non-transitory computer-readable medium of claim 15, wherein generating the tensor includes encoding the pre-processed filename into a one-hot feature vector, and wherein the tensor has a size of <pre-processed filename length, batch size, number of possible characters>.

19. The non-transitory computer-readable medium of claim 15, wherein the RNN output is a result of a softmax layer of the character-level RNN.

20. The non-transitory computer-readable medium of claim 15, wherein the operations further include:

obtaining training data including a set of text filenames and a class assigned to each of the text filenames of the training data;

generating one or more training tensors representing the set of text filenames of the set of training as a first set of one-hot vectors and one or more label tensors representing the classes assigned to each of the text filenames of the training data as a set second of one-hot vectors;

performing a first forward propagation pass by feeding the one or more training tensors to the character-level RNN resulting in a first prediction for the set of text filenames of the set of training;

determining a negative loss likelihood between the first prediction for the set of text filenames of the set of training and one or more label tensors;

performing a backpropagation pass to update parameters of one or more hidden layers of the character-level RNN; and performing one or more additional iterations of an additional forward propagation pass, determining a negative loss likelihood between an additional prediction for the set of text filenames of the set of training and one or more label tensors, and an additional back propagation pass.

* * * * *